United States Patent [19]
Blakley

[11] Patent Number: 5,352,274
[45] Date of Patent: Oct. 4, 1994

[54] AIR FILTER AND METHOD

[76] Inventor: Richard L. Blakley, 3060 Gladewater Ct., Pfafftown, N.C. 27040

[21] Appl. No.: 58,884

[22] Filed: May 10, 1993

[51] Int. Cl.⁵ .................. B01D 53/04; B01D 29/07
[52] U.S. Cl. ............................. 95/90; 95/141; 95/285; 96/135; 96/153; 55/497; 55/521; 55/524
[58] Field of Search ........... 55/521, 524, DIG. 5, 55/497, 501; 96/121, 135, 153, 154; 95/90, 116, 141, 273, 285

[56] References Cited

U.S. PATENT DOCUMENTS

| | | | |
|---|---|---|---|
| 2,479,722 | 8/1949 | Brixius | 55/501 X |
| 3,082,481 | 3/1963 | Hinde et al. | 96/135 X |
| 3,243,943 | 4/1966 | Getzin | 55/501 X |
| 3,388,536 | 6/1968 | Nash | 55/501 X |
| 3,830,045 | 8/1974 | Copenhefer | 55/501 |
| 4,042,358 | 8/1977 | Frohmader | 55/497 |
| 4,181,513 | 1/1980 | Fukuda et al. | 96/153 |
| 4,261,717 | 4/1981 | Belore et al. | 96/135 X |
| 4,289,513 | 9/1981 | Brownhill et al. | 96/135 |
| 4,377,400 | 3/1983 | Okamoto et al. | 96/153 X |
| 4,391,616 | 7/1983 | Imamura | 96/154 X |
| 4,484,938 | 11/1984 | Okamoto et al. | 96/154 X |
| 4,504,290 | 3/1985 | Pontius | 96/153 |
| 4,643,182 | 2/1987 | Klein | 55/524 X |
| 4,793,837 | 12/1988 | Pontius | 55/524 X |
| 4,992,319 | 2/1991 | Kurosawa et al. | 55/524 X |
| 5,120,331 | 6/1992 | Landy | 96/135 X |
| 5,194,414 | 3/1993 | Kuma | 96/153 X |

FOREIGN PATENT DOCUMENTS

| | | | |
|---|---|---|---|
| 50-031400 | 10/1975 | Japan | 96/153 |
| 56-031423 | 3/1981 | Japan | 96/153 |
| 56-084633 | 7/1981 | Japan | 96/153 |
| 57-056019 | 4/1982 | Japan | 96/153 |
| 58-027618 | 2/1983 | Japan | 96/153 |
| 58-219921 | 12/1983 | Japan | 96/153 |
| 1550960 | 8/1979 | United Kingdom | 96/135 |

*Primary Examiner*—Robert H. Spitzer

[57] ABSTRACT

An air filter is provided for removing gaseous impurities from the air such as formaldehyde, acetaldehyde, acrolein, acetone and other chemical compounds. The filter utilizes a plurality of corrugated base sheets which are stacked or nestled and which have entrapped carbon dust for absorption of impurities. The corrugated structure provides very little pressure drop as the air passes through available channels and large, powerful fans are not necessary to move air therethrough.

14 Claims, 1 Drawing Sheet

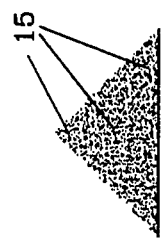
FIG. 1
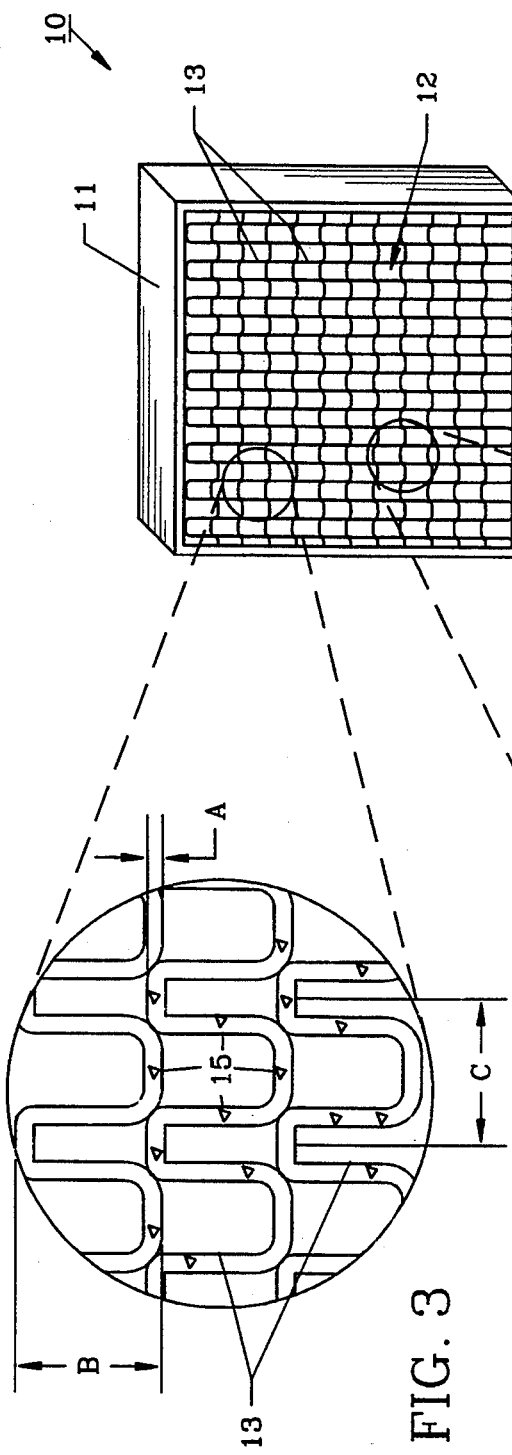
FIG. 3
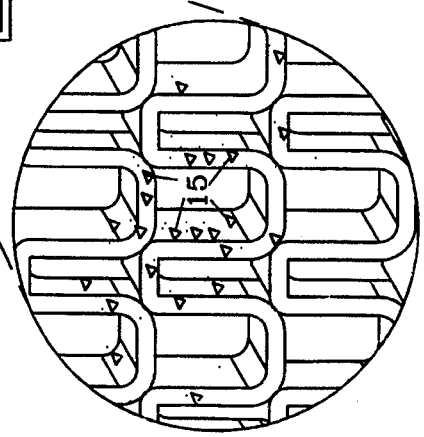
FIG. 2
FIG. 4

AIR FILTER AND METHOD

BACKGROUND OF THE INVENTION

1. Field of the Invention

The invention herein pertains to air filters and particularly to air filters for removing gaseous impurities from the air as may be found in homes and other building interiors.

2. Description of the Prior Art and Objectives of the Invention

In modern industrialized societies, homes, offices and the like are bombarded with harmful gaseous chemical molecules which are present within the occupants' living spaces. Paints, wallpapers, curtains, carpets, furniture finishes and other products and coatings emit various chemical compounds, some of which can be harmful to the occupants when inhaled. Formaldehyde, acetaldehyde, acrolein, acetone, ozone, radon and other chemicals are commonly found in furnished homes and offices and may contribute to long term health problems as a result of continued exposure.

Various types of filters have been employed in the past such as electrostatic precipation filters, carbon bed filters in which carbon granules are densely packed in a bed and activated carbon fiber filters to remove gaseous impurities. Certain of such filters, when effective, generally have a high pressure drop and increase the cost of the air handling system by requiring the use of heavy duty or high capacity blowers and fans. Carbon fiber type filters do not provide the number of absorbing sites required for efficiency in removing gaseous impurities.

With the disadvantages and problems associated with prior art filter devices used, the present invention was conceived and one of its objectives is to provide an air filter which is relatively low in cost to manufacture and sell yet which will effectively remove common gaseous impurities from the air.

It is also an objective of the present invention to provide an air filter which provides only a minimal pressure drop therethrough and which will remove, with great efficiency, air impurities.

It is still another objective of the present invention to provide an air filter which utilizes corrugated sheets formed with small diameter carbon particles for chemical impurity removal.

Various other objectives and advantages of the present invention become apparent to those skilled in the art as a more detailed presentation is set forth below.

SUMMARY OF THE INVENTION

An air filter and method of producing the same is presented whereby a filter is formed by first forming a base sheet having an absorbing agent therein such as carbon particles having a diameter of about 10–250 micrometers in the amount of approximately one-half the weight of the paper. Such paper is manufactured by Kimberly-Clark Corporation under the designation XCCW/50KCG; XCCW/30-KCG; and XCCW/17-KCG. The carbon particle paper is then corrugated to form a series of ridges and a plurality of such corrugated sheets are then stacked or nestled. The sheets are cut into desired lengths to form a filter section which is reinforced and framed for use in conventional household or other air handling systems. The corrugated sheets form passages through the filter section which will allow air to freely move therethrough and will absorb impurities from the air by the porous surfaces of the entrapped carbon particles. The air filter as described can be useful in absorbing acetone, formaldehyde and other gaseous chemical molecules which can cause harm through prolonged breathing.

BRIEF DESCRIPTION OF THE DRAWINGS

FIG. 1 illustrates a typical air filter of the invention as may be used in a home air handling system;

FIG. 2 shows a small portion of the filter section as seen in FIG. 1 in an enlarged, perspective view;

FIG. 3 depicts an elevational view of another portion of the air filter section as shown in FIG. 1; and FIG. 4 illustrates a quantity of carbon particles as used in the wood pulp slurry for forming carbon entrapped base sheets.

DESCRIPTION OF THE PREFERRED EMBODIMENTS

The preferred form of the invention is shown in FIGS. 1–3 in which an air filter is formed by the use of a plurality of nestled base sheets which have been conventionally formed having small diameter carbon particles entrapped therein as seen in FIG. 4. The carbon particles have a diameter of about 10–250 micrometers with a particularly preferred range of about 40 micrometers and have been incorporated into a paper base sheet formed from an unbleached softwood pulp. The impregnated carbon particles are applied to the paper making slurry in an amount which approximates 5 to 65 percent of the weight of the paper with a preferred amount of 50 percent. The corrugation process provides ridges approximately one millimeter in width and height and the corrugated sheets overlap or nestle approximately 0.006 inches. The preferred carbon particles as used herein are commercially available as PCB coconut carbon and have an overall size which will pass (ninety percent) through a 325 mesh screen. Other examples of suitable carbons are GRC-11, S-Sorb, BPL, CRC-11F, SGL, HMC, ASC/GR-1, SC-II all from Calgon Carbon Corporation and WV-B, SA-20, and BSA-20 from Westvaco Corp. A filter formed from the corrugated sheets will provide a pressure drop of only about 0.23 millimeters of water per millimeter of filter width. Various chemicals can be absorbed by the filter such as formaldehyde, acetaldehyde, acrolein, acetone and other gases which may originate from paints, varnishes, cleaning fluids and other common household products.

DETAILED DESCRIPTION OF THE DRAWINGS AND OPERATION OF THE INVENTION

For a better understanding of the invention and its operation, turning now to the drawings, FIG. 1 demonstrates air filter 10 of the invention which as may be used for a conventional household furnace or air conditioning system. Filter 10 is rectangular in shape and may have a height of twenty-four inches, a width of eighteen inches and a thickness of one inch. Various sizes and shaped filters of the invention could be manufactured for different installations and uses. as would be understood by those skilled in the art. Filter 10 includes a frame 11 formed from a suitable material such as cardboard, plastic or a light metal and provides a filter section 12 which consists of a plurality of paper base sheets 13 which are "stacked" or nestled as shown more clearly in FIGS. 2 and 3. Metal support wires help strengthen filter 10. Base sheets 13 may be formed from an unbleached softwood pulp slurry having an absorbing agent such as small diameter carbon particles 15 as shown in FIG. 4. Carbon particles 15 are sized to have a ninety percent passage through a 325 mesh screen and generally have a diameter of approximately 10 to 250 micrometers. One variety of carbon particles that has been found to work exceptionally well consists of PCB coconut carbon as sold by Calgon Carbon Company. Filter base sheets 13 are conventionally formed having an amount typically of fifty percent by sheet weight of the carbon particles and said sheets may have a tensile strength of approximately 1100–4000 grams per inch, a thickness of approximately 0.003–0.008 inches and a weight of approximately 50 grams per square meter.

The corrugated base sheets provide channels 12 as seen in FIG. 3 for air passage and thus display very little pressure drop for the air moving therethrough. Filter 10 as described has a pressure drop of approximately 0.23 mm of water per mm of filter width, with a static flow rate of 17.5 cc/sec. although greater or lower pressure drops may be obtainable. As further shown in FIGS. 2 and 3, base sheets 13 nestle approximately 0.006 inches as seen at "A" and each base sheet 13 has a height of approximately 1 millimeter (see "B") and the length of each corrugation cycle is approximately 1 millimeter (see arrow "C").

As would be understood, impurities in the form of gaseous chemical molecules diffuse very rapidly and display a great deal of "Brownian" movement. As impurity molecules enter channels 12 as seen in FIG. 3, they contact entrapped carbon particles 15 thereon and become absorbed. Thus, filter 10 does not require a high pressure drop in order to perform well. The very small size of carbon particles 15 presents a vast surface area per weight of the particles and this large surface area increases the rate of absorption and the number of absorption sites over carbon fiber type filters. As would be understood, various size corrugations could be utilized depending on the particular application although the dimensions as shown in FIG. 3 have been found satisfactory for most household uses in the removal of formaldehyde, acetaldehyde, acrolein and acetone which may originate from typical household cleaners, fabrics and other common household sources.

The process of forming filter 10 having base sheets 13 as shown in FIGS. 1 and 2 includes selecting a conventional paper sheet with entrapped carbon particles 15 as described above having a diameter of approximately 10–250 micrometers. The weight of carbon particles 15 approximates one-half the weight of the paper sheet. Next, the carbon entrapped sheets are directed to conventional dry corrugating equipment where they are uniformly shaped as shown in FIG. 2. However, wet/heated corrugating techniques minimize paper fibrillation and the heated embosser presses and sets the corrugations into the paper which makes them rigid and uniform. The sheets are then cut and layered or nestled to provide a sufficient overlap. A suitable frame 11 is then placed around the filter section to maintain stability of the filter section. To further reinforce the center of filter 10 small wires or threads can be run through filter 10 with a one to three inch spacing as necessary for support. Lastly, the corrugated gas filter can also be combined with a particulate filter made of materials currently used for indoor filtration.

The illustrations and examples provided herein are for explanatory purposes and are not intended to limit the scope of the appended claims. Additional chemical impurities may be removed by employing absorbing agents other than carbon, and base sheets, other than paper may also be suitable under certain circumstances.

I claim:

1. A method of filtering air comprising the steps of:
   (a) forming a first sheet with an absorbing agent consisting of approximately fifty percent by weight of carbon particles having a diameter of 10–250 micrometers;
   (b) corrugating the formed sheet;
   (c) forming a second sheet identical to said first sheet;
   (d) corrugating the second formed sheet;
   (e) nestling said first sheet with said second sheet wherein said first sheet is in direct contact with said second sheet;
   (f) placing the nestled sheets in a frame; and
   (g) placing the framed sheets into the path of an air current.

2. The method of claim 1 and including the step of reinforcing the framed sheets with at least one metal support wire.

3. The method of claim 1 wherein the step of forming the first sheet comprises the step of forming the first sheet with carbon particles having diameters of about 10–250 micrometers comprises forming the first sheet with carbon particles formed from processed coconut shells.

4. An air filter comprising: a plurality of corrugated base sheets, said corrugated base sheets nestled vertically one within another carbon particles, said corrugated base sheets formed with said carbon particles entrapped therein whereby impure air contacting said corrugated base sheets will cause impurities within said air to be entrapped within said carbon particles to thereby filter the air.

5. An air filter as claimed in claim 4 wherein said corrugated base sheets comprise corrugated paper.

6. An air filter as claimed in claim 5 wherein said corrugated paper base sheets are formed from an unbleached softwood pulp.

7. An air filter as claimed in claim 4 wherein said corrugated base sheets comprise 50% by weight carbon particles.

8. An air filter as claimed in claim 4 wherein said carbon particles have a diameter of about 10–250 micrometers.

9. An air filter as claimed in claim 4 wherein said corrugated base sheets have a weight of approximately 50 grams/square meter.

10. An air filter as claimed in claim 4 wherein said carbon particles have a size of 90% passage through a 325 mesh screen.

11. An air filter comprising: a plurality of corrugated paper base sheets, said base sheets comprising carbon particles entrapped therein, said carbon particles having a diameter of from 10–250 micrometers, said carbon particles comprising approximately fifty percent by weight of said base sheets, said base sheets nestled vertically one within another and in direct contact with one another.

12. An air filter as claimed in claim 11 wherein each of said corrugated sheets have a thickness of approximately 0.003–0.008 inches.

13. An air filter as claimed in claim 11 wherein the height of each corrugated sheet is approximately 1 mm.

14. An air filter as claimed in claim 11 wherein said sheet nestle one within another approximately 0.006 inches.

* * * * *